United States Patent [19]

Chang et al.

[11] Patent Number: 4,951,267

[45] Date of Patent: Aug. 21, 1990

[54] METHOD AND APPARATUS FOR MULTIPOLE ACOUSTIC LOGGING

[75] Inventors: Shu-Kong Chang, West Redding; Benoit G. Froelich, Bethel; Gyula Varga, Brookfield, all of Conn.

[73] Assignee: Schlumberger Technology Corporation, New York, N.Y.

[21] Appl. No.: 919,293

[22] Filed: Oct. 15, 1986

[51] Int. Cl.[5] .............................................. G01V 1/00
[52] U.S. Cl. ........................................ 367/31; 367/30; 367/138; 73/152
[58] Field of Search ...................... 367/30, 31, 35, 32, 367/41, 75, 138; 181/104, 105; 166/206; 73/151, 152

[56] References Cited

U.S. PATENT DOCUMENTS

| | | | |
|---|---|---|---|
| 3,208,548 | 9/1965 | Levin et al. | 367/30 |
| 3,475,722 | 10/1969 | White | 367/31 |
| 3,593,255 | 7/1971 | White | 367/25 |
| 3,949,352 | 4/1976 | Vogel | 367/31 |
| 4,184,546 | 1/1980 | Nicolas et al. | 166/206 |
| 4,339,810 | 7/1982 | Nichols et al. | 367/41 |
| 4,365,321 | 12/1982 | vonBose | 367/25 |
| 4,399,692 | 8/1983 | Hulsing, II et al. | 73/151 |
| 4,450,543 | 5/1984 | Neeley | 367/154 |
| 4,450,928 | 5/1984 | Weber et al. | 181/121 |
| 4,594,691 | 6/1986 | Kimball et al. | 367/32 |
| 4,606,014 | 8/1986 | Winbow et al. | 181/104 |
| 4,632,212 | 12/1986 | Benzing | 367/35 |
| 4,649,526 | 3/1987 | Windbow et al. | 367/35 |
| 4,682,308 | 7/1987 | Chung | 367/31 |
| 4,693,335 | 9/1987 | Almon | 367/25 |
| 4,713,968 | 12/1987 | Yale | 367/31 |
| 4,794,572 | 12/1988 | Sondergeld et al. | 367/31 |

FOREIGN PATENT DOCUMENTS

| | | |
|---|---|---|
| 0224350 | 6/1987 | European Pat. Off. |
| 2145521A | 3/1985 | United Kingdom |
| 2158581 | 11/1987 | United Kingdom ................. 367/31 |

OTHER PUBLICATIONS

Hardee, Downhole Periodic Seismic Sources, 1983, pp. 57-71.

*Primary Examiner*—Thomas H. Tarcza
*Assistant Examiner*—Daniel T. Pihulic
*Attorney, Agent, or Firm*—Clifford L. Tager

[57] ABSTRACT

Apparatus for shear wave borehole logging has a source section 30, a spacer section 32, a detector section 34 and a coupling section 36, adjacent sections being linked by isolation joints 38. The source section 30 has a slotted steel housing 48 containing a source 42 with two transducers 44a/44b and 44c/44d each arranged to produce acoustic radiation with a dipole radiation pattern. The transducers are oriented so that their radiation patterns are transverse to one another and to the borehole axis. The detector section 34 also has a slotted steel housing 80 and contains six detectors 82 each with two transducers 84a/84b and 84c/84d arranged similarly to the source transducers. The isolation joint 38 between adjacent sections comprises lengths of steel wire 76 secured at each end to one of the sonde sections and bridging a gap between the sections. In use each of the source transducers is energized in turn as the apparatus is drawn up the borehole, and the waveforms of signals received by the twelve detector transducers are digitized and recorded. Various analyses of the recordings enable the formation shear slowness to be derived, even in 'slow' formations, and permit information to be obtained regarding the magnitude and orientation of anisotropy in the formation.

22 Claims, 8 Drawing Sheets

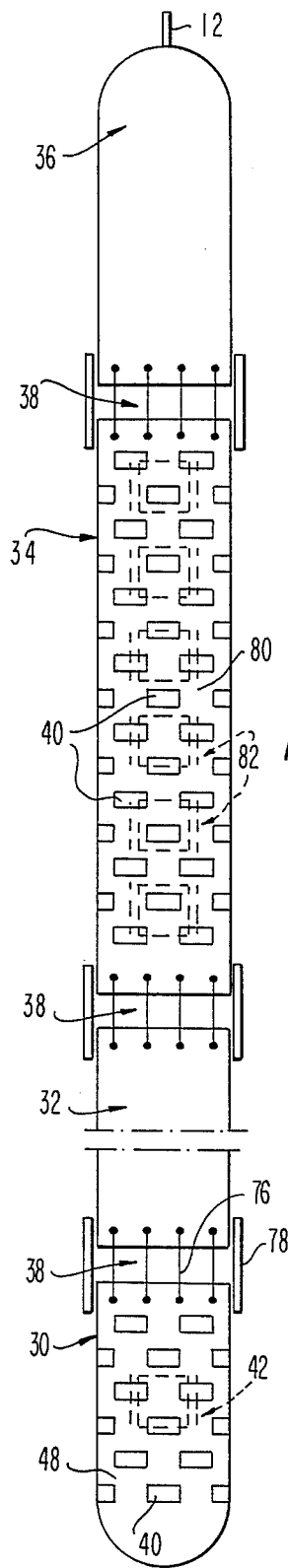
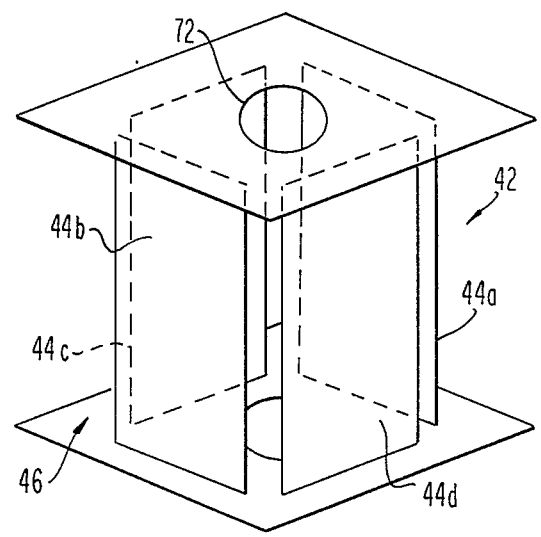
Fig. 3
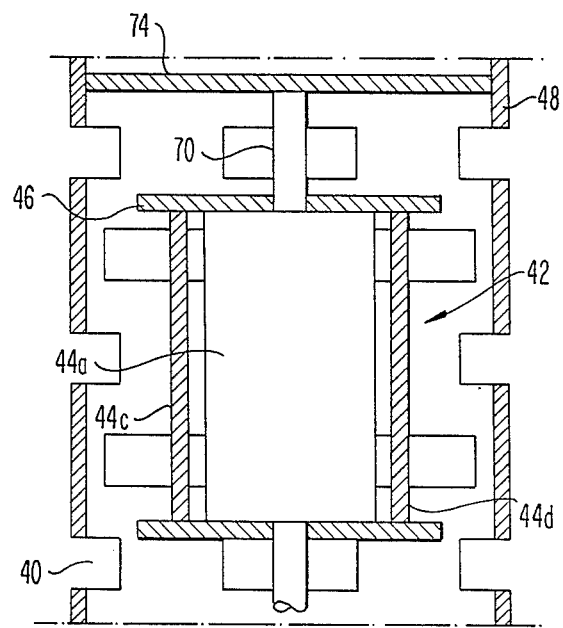
Fig. 6
Fig. 2

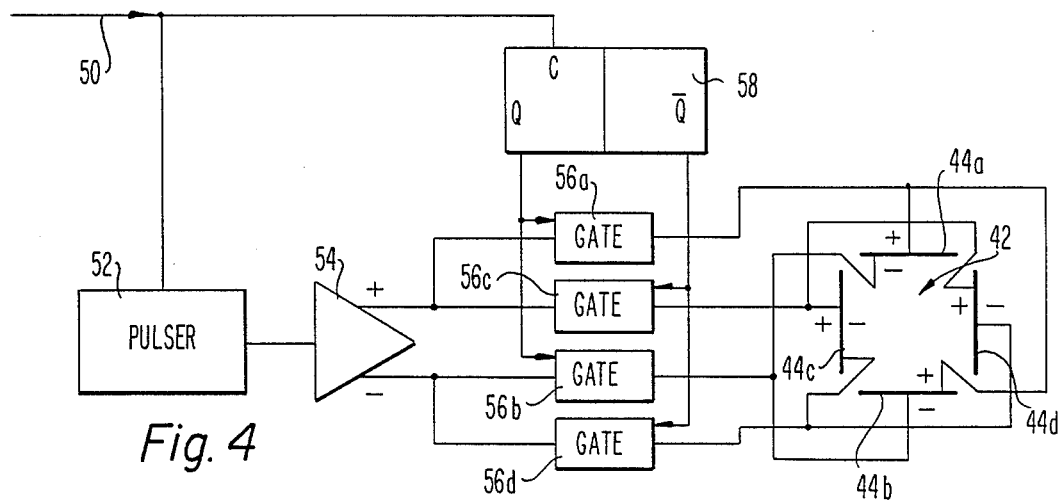
Fig. 4
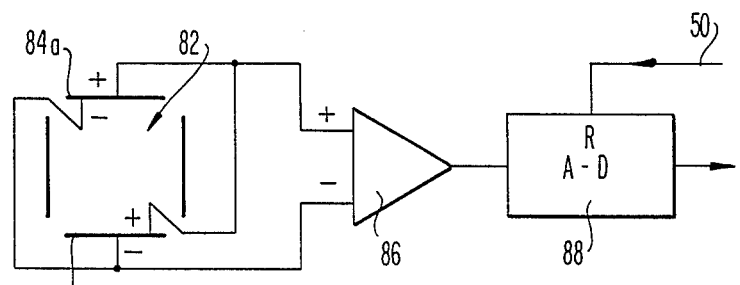
Fig. 7
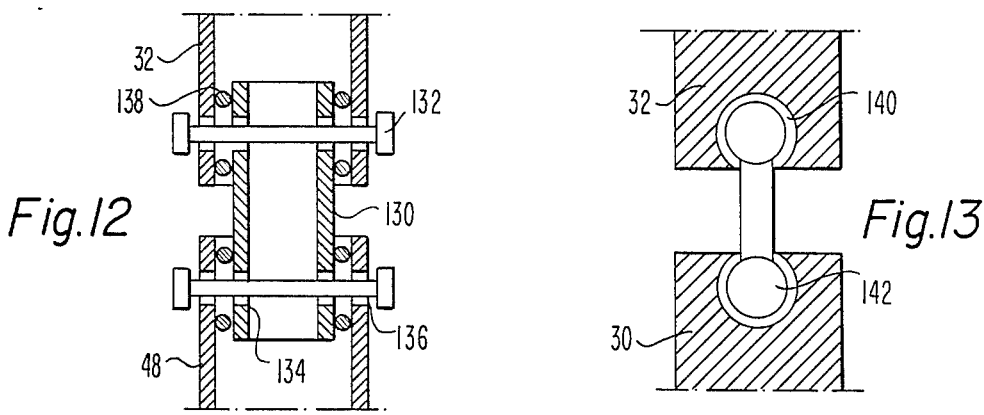
Fig. 12
Fig. 13

METHOD AND APPARATUS FOR MULTIPOLE ACOUSTIC LOGGING

BACKGROUND OF THE INVENTION

This invention relates to methods and apparatus for multipole acoustic logging, for example for logging the shear wave propagation characteristics of earth formations traversed by a borehole.

Conventional acoustic logging of earth formations traversed by a borehole is accomplished by means of a logging tool lowerered into the borehole on an armored communication cable. Such a tool typically incorporates several acoustic transducers, at least one being operated to produce acoustic signals and one or more others being operated to detect such signals. These transducers are commonly made of piezoelectric ceramic or magnetostrictive materials which expand and contract transversely to their surfaces (i.e. change in thickness) in response to electrical excitation, or conversely generate electrical voltages between those surfaces when subjected to pressure fluctations. Thus the transmitter can be driven with an appropriate oscillating electrical signal to generate pressure fluctuations in liquid in the borehole. These pressure fluctuations propagate as acoustic signals through the liquid and into and through the surrounding formations. The signals traversing the formations couple back into the borehole liquid, for example in the vicinity of the receivers, causing pressure fluctuations which result in electrical voltages at the outputs of the receivers. These voltages are sensed and amplified, and may be processed downhole to extract information for transmission up the cable; alternatively the waveforms of the received signals may be transmitted uphole, for example as digitized time samples, for processing at the surface. The excitation of the transmitter is commonly pulsed, enabling determination for example of the time taken by an acoustic signal to propagate the known distance between the transmitter and the receiver, and thus of the velocity (or its inverse, slowness) of acoustic propagation in the formations.

Although the type of transmitter most commonly used (a cylinder) generates pressure or P waves, known tools are not limited to investigating the propagation of such waves. When the P wave reaches the borehole wall, some of the acoustic energy is typically converted into other modes of acoustic propagation. Thus, shear or S waves may be excited in the formation, and Stoneley waves (including the low-frequency type known as tube waves) may be excited at the borehole/formation interface. Because these different modes generally travel at different speeds these additional modes can sometimes be distinguished in the receiver signals. Determination of such parameters as the speed and attenuation of P, S and Stoneley waves is useful in investigating a variety of subsurface formation properties of interest in the exploration for hydrocarbons and other valuable raw materials.

However, in certain circumstances transmitters which generate pressure waves are not effective in inducing propagation of S waves in a manner that permits their detection from within the borehole. If the speed of S waves in the formation is less than the speed of acoustic (pressure) waves in the borehole liquid, as in the case of a so-called 'soft' or 'slow' formation, shear wave energy in the formation cannot induce corresponding phenomena in the borehole liquid so the shear wave cannot be detected and its velocity cannot be found.

Various techniques have been suggested to facilitate the logging of shear wave properties of subsurface formations irrespective of relative borehole and formation sonic properties. Thus, a variety of sources for exciting shear waves directly have been proposed. These have included various forms of contact devices (U.S. Pat. Nos. 3,354,983, 3,683,326, 4,380,806, 4,394,754, 4,549,630). U.S. Pat. No. 3,475,722 teaches the use of three geophones arranged along mutually orthogonal axes on a common mount pressed into contact with the borehole wall. However all these devices suffer from the problem of requiring direct contact with the formation, and the consequent difficulties of limitation on logging speed, risk of the tool sticking and bad contact in poorly consolidated formations.

More recently, various kinds of multipole or azimuthally asymmetric transducers which can be suspended in the borehole liquid have been proposed for direct or indirect shear wave logging, such as dipole transducers (U.S. Pat. Nos. 3,593,255, 4,207,961, 4,383,591, 4,516,228; GB patent specification 2,124,377; EP patent specification 0,031,898), quadrupole transducers (GB patent specifications 2,122,351, 2,132,763) and octopole transducers (GB patent specification 2,130,725). Another suggestion has been to use geophones suspended in the liquid in a borehole and with a buoyancy adjusted to be nearly neutral for sympathetic movement with the borehole wall (U.S. Pat. No. 4,369,506); one such proposal (U.S. Pat. No. 4,542,487) provides geophones in orthogonally mounted pairs. These buoyancy adjustments are difficult to make accurately and significantly complicate the use of such devices.

Furthermore, previously known devices have relied on the use of non-rigid sondes, for example using cable or rubber hose to interconnect portions of the logging apparatus, in order to reduce problems introduced by propagation of extensionsal and bending acoustic energy directly along the sonde from the source to the detector. Such non-rigid sondes lack ruggedness and are therefore neither easy to use nor able to withstand prolonged operation in the rigorous environment typical of borehole logging.

It is an object of this invention to provide a method and apparatus for shear wave acoustic logging of subsurface earth formations which does not require direct physical contact between the logging apparatus and the formation.

It is also an object of this invention to provide a method and apparatus for shear wave acoustic logging of subsurface earth formations which provides information as a function of azimuthal direction around the tool.

A further object of the invention is to provide a method and apparatus for shear wave acoustic logging of subsurface earth formations which enables quantification of formation or rock anisotropy and identification of minimum and maximum stress directions. Such information is valuable in the interpretation of seismic records, the planning of enhanced oil recovery and the planning of hydrofracturing operations for example.

SUMMARY OF THE INVENTION

According to one aspect of this invention apparatus for acoustic logging to determine a property of subsurface formations traversed by a liquid-filled borehole comprises an elongate sonde with source means and detector means mounted thereon. The source means has a dipole or other multipole radiation pattern and is adapted to cause propagation of acoustic radiation in the formation via the borehole liquid. The acoustic radiation has a variable direction of vibration in the formation transverse to the direction of propagation of the radiation. The detector means, which is spaced from the source means and has a dipole or other multipole sensitivity characteristic, is arranged to detect via the borehole liquid acoustic radiation propagating in the formation, and generate a signal representative of the detected radiation. The detector means is sensitive to radiation having a selectable direction of vibration in the formation transverse to the direction of propagation. The apparatus includes means coupled to the detector means for receiving its signal and deriving a tangible representation of a parameter of said formation, such as shear wave velocity, formation anisotropy and/or stress anisotropy.

In one embodiment the source means is arranged selectively to propagate acoustic radiation with a first direction of vibration in the formation transverse to the direction of propagation, and selectively to propagate acoustic radiation with a second direction of vibration in the formation transverse to the direction of propagation and at an angle (and preferably orthogonal) to the first direction of vibration. Likewise the detector means is arranged to detect acoustic radiation propagating in the formation with a third direction of vibration in the formation transverse to the direction of propagation (and typically parallel to the first direction), and to detect acoustic radiation propagating in the formation with a fourth direction of vibration in the formation transverse to the direction of propagation and at an angle to said third direction of vibration (typically parallel to the second direction).

The source means and the detector means are preferably located in different sections of the sonde, coupled by an acoustic attenuation joint which in the preferred embodiment comprises a plurality of wires extending between the sections and secured to them.

The source means may comprise two dipole sources mounted for propagating acoustic radiation with respective, orthogonal directions of vibration. The detector means may likewise comprise two dipole detectors mounted for detecting acoustic radiation with respective, orthogonal directions of vibration. In one preferred embodiment the source means is arranged to propagate acoustic radiation with said first and second directions of vibration alternately, and the detector means generates signals representative of the detected radiation with both the third and fourth directions of vibration.

According to another aspect of the invention apparatus for acoustic logging to determine a property of subsurface formations traversed by a borehole, includes an elongate sonde adapted for movement through a liquid-filled borehole traversing an earth formation. First source means is mounted on the sonde for selectively causing propagation of acoustic radiation in the formation with a multipole radiation pattern via the borehole liquid and with a direction of vibration in the formation transverse to the direction of propagation, and second source means is likewise mounted on the sonde adjacent the first source means for selectively causing propagation of acoustic radiation in the formation with a multipole radiation pattern via the borehole liquid and with a direction of vibration in the formation transverse to the direction of propagation and to the direction of vibration of radiation from the first transducer means. First detector means is also mounted on the sonde, spaced therealong from the first and second source means, and having a multipole sensitivity characteristic, for detecting via the borehole liquid acoustic radiaion propagating in the formation with a direction of vibration in the formation transverse to the direction of propagation, and generating a signal respresentative of radiation detected thereby. Similarly, second detector means is mounted on the sonde adjacent the first detector means and having a multipole sensitivity characteristic, for detecting via the borehole liquid acoustic radiation propagating in the formation with a direction of vibration in the formation transverse to the direction of propagation and to the direction of vibration of radiation detected by the first detector means, and generating a signal representative of radiation detected thereby. Means coupled to the first and second detector means for receiving the signals derives from the signals a tangible representation of a parameter of the formation.

Another aspect of the invention provides apparatus for acoustic logging to determine a property of subsurface formations traversed by a borehole, comprising an elongate sonde adapted for movement through a liquid-filled borehole traversing an earth formation; first transducer means mounted on the sonde and having a multipole sensitivity characteristic, for detecting via the borehole liquid acoustic radiation propagating in the formation with a direction of vibration in the formation transverse to the direction of propagation, and generating a first respective signal representative of radiation detected thereby; second transducer means mounted on the sonde and having a multipole sensitivity characteristic, for detecting via the borehole liquid acoustic radiation propagating in the formation with a direction of vibration in the formation transverse to the direction of propagation and to the direction of vibration of radiation detected by the first transducer means, and generating a second respective signal representative of radiation detected thereby; and means coupled to the first and second transducer means for receiving the first and second respective signals and deriving therefrom a tangible representation of a parameter of the formation.

According to a further aspect of the invention apparatus for acoustic logging to determine a property of subsurface formations traversed by a borehole comprises an elongate sonde adapted for movement through a liquid-filled borehole traversing an earth formation and having at least two housing sections and joint means coupling the housing sections and comprising a plurality of wires extending between and secured to the sections. Such a configuration has been found to facilitate isolation of detectors from the transmission of acoustic energy along the body of the sonde.

According to another aspect of the invention there is provided a method of acoustic logging to determine a property of subsurface formations traversed by a liquid-filled borehole, comprising causing propagation in a subsurface formation traversed by a borehole of acoustic radiation with a multipole radiation pattern via the borehole liquid and with a variable direction of vibration in the formation transverse to the direction of propagation, detecting with a multipole sensitivity characteristic via the borehole liquid acoustic radiation propagating in the formation with a selectable direction of vibration in the formation transverse to the direction of propagation, and generating a signal representative of the detected radiation, and deriving from the signal a tangible representation of a parameter of the formation.

In a preferred embodiment acoustic radiation is selectively propagated with a first direction of vibration in the formation transverse to the direction of propagation, and also with a second direction of vibration in the formation transverse to the direction of propagation and at an angle (and preferably orthogonal) to the first direction of vibration. Likewise acoustic radiation is detected propagating in the formation with a third direction of vibration in the formation transverse to the direction of propagation (and typically parallel to the first direction) and with a fourth direction of vibration in the formation transverse to the direction of propagation and at an angle to said third direction of vibration (typically parallel to the second direction).

In one preferred embodiment acoustic radiation is propagated with said first and second directions of vibration alternately, and individual signals representative of the detected radiation with both the third and fourth directions of vibration are generated.

According to another aspect of the invention a method of acoustic logging to determine a property of subsurface formations traversed by a liquid-filled borehole, comprises detecting with a multipole sensitivity characteristic via the borehole liquid acoustic radiation propagating in the formation with a first direction of vibration in the formation transverse to the direction of propagation, and generating a first respective signal representative of said acoustic radiation propagating with said first direction of vibration; detecting with a multipole sensitivity characteristic via the borehole liquid acoustic radiation propagating in the formation with a second direction of vibration in the formation transverse to the direction of propagation and to said first direction of vibration, and generating a second respective signal representative of said acoustic radiation propagating with said second direction of vibration; and deriving from said first and second respective signals a tangible representation of a parameter of said formation.

The invention also provides a method of acoustic logging of anisotropy of subsurface formations traversed by a borehole, comprising generating a first signal representative of shear acoustic wave propagation with a first direction of polarization in a formation, generating a second signal representative of shear acoustic wave propagation with a second direction of polarization in the formation, evaluating a predetermined function of at least one predetermined parameter of said first and second signals, and generating a tangible representation of anisotropy in accordance with said evaluation. Information on the anisotropy can be obtained, for example, by comparing shear wave velocities or amplitudes for two orthogonal polarizations.

BRIEF DESCRIPTION OF THE DRAWINGS

Additional objects and features of the invention will become more apparent upon consideration of the following detailed description of the invention, reference being had to the accompanying drawings in which:

FIG. 2 is a side view of apparatus in accordance with this invention;

FIG. 3 is a schematic perspective view of a transducer forming part of the apparatus of FIG. 2;

FIG. 4 is a block diagram of circuitry associated with a source transducer forming part of the apparatus of FIG. 2;

FIG. 6 is a sectional view showing the mounting of the transducer of FIG. 2;

FIG. 7 is a block diagram of circuitry associated with a detector transducer forming part of the apparatus of FIG. 2;

FIG. 12 is a sectional view of a modified isolation joint forming part of the apparatus of FIG. 2;

FIG. 13 is a sectional view of another modified isolation joint forming part of the apparatus of FIG. 2;

DETAILED DESCRIPTION

Figure 1:
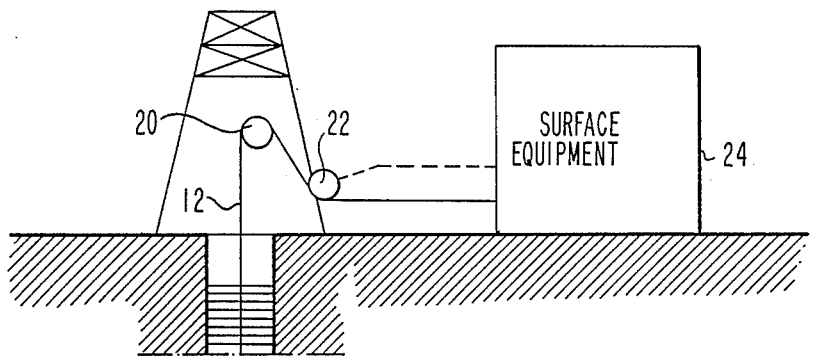
FIG. 1 is a schematic diagram of a borehole logging operation using apparatus in accordance with this invention.

Referring to FIG. 1, an elongate logging tool or sonde 10 is suspended on an armored communication cable 12 in a borehole 14 penetrating an earth formation 16. The borehole 14 is filled with liquid 18 such as drilling mud used to stabilize the borehole wall and prevent escape of formation fluids up the borehole. The sonde 10 is moved in the borehole 14 by paying the cable 12 out and reeling it back in over a sheave wheel 20 and a depth gauge 22 by means of a winch forming part of a surface equipment 24. Usually the logging measurements are actually made while the sonde 10 is being raised back up the borehole 14, although in certain circumstances they may additionally or alternatively be made on the way down. The depth gauge 22 measures displacement of the cable 12 over the sheave wheel 20 and thus the depth of the tool 10 in the borehole 14.

The tool 10 includes an acoustic source section 30 at the bottom, a spacer section 32 separating this source section from an acoustic detector section 34, and a coupling section 36 above the detector section and attached to the cable 12. The sections 30 through 36 are coupled mechanically to each adjacent section by acoustic isolation joints 38. The source section 30 generates acoustic radiation which propagates through the liquid 18 to and then up the formation 16. Some of the acoustic radiation propagates back through the liquid 18 to the detector section 34 which generates digitized signals representative of successive samples of the waveform of the detected radiation. These signals are suitably conditioned by processing and interface circuitry in the sonde 10 for transmission up the cable 12 to the surface equipment 24. The equipment 24 typically receives, decodes, amplifies and records the signals on chart and/or magnetic tape recorders as a function of the depth signals generated by the depth gauge 22. In addition the equipment 24 may process the data represented by these signals to yield indications of the required formation parameters which are also recorded. Further processing of these and other signals from the sonde 10 enables the surface equipment 24 to monitor the operation of the sonde 10 and generate signals which are transmitted down the cable 12 to control the sonde 10, for example to synchronize the operation of its component circuits or modify circuit parameters such as amplifier gain.

FIG. 2 shows the sonde 10 in greater detail. Referring to FIG. 2, the source section 30 has a sleeve 48 closed at one end and made of steel pipe perforated by numerous slots as at 40. This section contains an acoutic source 42 for propagating acoustic radiation through the borehole liquid 18 to the formation 16. As shown schematically in FIG. 3, one possible configuration of this source incorporates four matched active radiating elements 44. These elements may for example be rectangular, piezoelectric bimorph bender elements of known kind which deflect transversely to their surfaces when a voltage is applied between those surfaces. The elements 44 are secured along opposite edges to support plate 46, and opposed pairs of the elements, such as 44a and 44b, are oriented to deflect in the same direction when the same polarity voltage is applied to like-facing surfaces of the elements. In the illustrated embodiment of the invention like-facing surfaces of opposed pairs of the elements are connected together to receive the same driving voltage. This orientation and interconnection is indicated in FIG. 4 by + and − symbols adjacent each element 44.

Also shown in FIG. 4 is a form of driving circuitry for the source 42. A trigger signal is supplied on a line 50, for example by a timer circuit in the sonde 10 or the surface equipment 24. This trigger signal fires a pulser 52 which supplies a pulse comprising one cycle of a sinusoid waveform to a push-pull amplifier 54. The frequency of the waveform is preferably chosen in accordance with the criteria discussed in co-pending U.S. patent application Ser. No. 687,074 filed Dec. 28, 1984 and assigned to the assignee hereof. To optimize the shear measurement it is generally desirable to use a frequency within a range whose upper bound $f_c$ is given by:

$$f_c = v_s/2\pi a$$

where $v_s$ is the formation shear velocity and a is the borehole radius. For most formations the operating frequency is typically in the range 1 to 5 kHz. However, the frequency may exceed the limit $f_c$ in certain circumstances, for example to obtain a stronger signal by exciting borehole flexural waves and then derive shear velocity in the manner described in co-pending U.S. patent application Ser. No. 687,075 filed Dec. 28, 1984 and assigned to the assignee hereof.

The output of the amplifier 54 is coupled to four gates 56a to 56d each of which is coupled to a respective pair of the elements 44 in the acoustic source 42. The gates 56a and 56b are coupled to respective surfaces of the opposed pair of elements 44a and 44b and receive opposite polarity signals from the amplifier 54. Both of these gates are controlled by a Q output of a bistable circuit 58 having a clock input C connected to the trigger signal line 50. The gates 56c and 56d ae likewise connected to respective surfaces of the opposed pair of elements 44c and 44d and receive opposite polarity signals from the amplifier 54, but are controlled by an inverse-Q output of the bistable circuit 58. Thus each successive trigger signal on the line 50 energizes the Q and inverse-Q outputs of the bistable circuit 58 alternately, and the amplified pulse output of the amplifier 54 is coupled to the pairs of elements 44a/44b and 44c/44d alternately.

Figure 5:
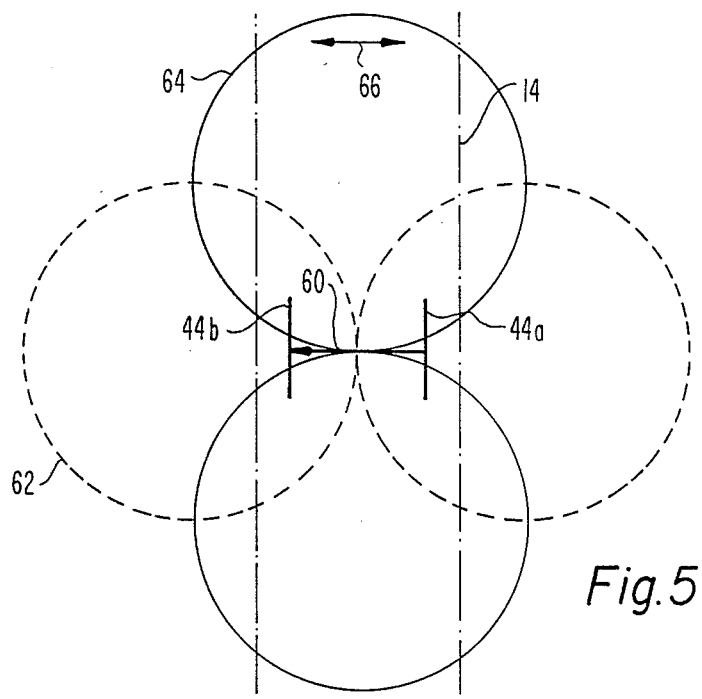
FIG. 5 is a diagram illustrating the radiation pattern of a dipole section of the source transducer of FIG. 4.

The interconnection and energization of the elements 44 as shown in FIG. 4 causes both elements of each opposed pair to deflect in the same direction, producing a dipole compressional (P) wave radiation pattern with maxima along the direction of deflection. This is illustrated in FIG. 5 for the pair of elements 44a and 44b, where the arrow 60 indicates the direction of deflection and the dotted circles 62 indicate the azimuthal variation in the magnitude of the compressional wave. Although the pattern is symmetric in magnitude it is asymmetric in polarity: a positive pressure fluctuation to one side of the transducer 42 is always accompanied by a negative pressure fluctuation to the other side. Thus when the compressional wave reaches the borehole wall it induces a shear (S) wave in the formation 16 propagating in a direction generally parallel to the borehole 14. The direction (or polarization) of formation particle vibration in this S wave is transverse both to the borehole axis and to the direction of propagation of the wave, as indicated by the double-headed arrow 66, and the magnitude of the shear wave vibration exhibits a dipole radiation pattern with maxima transverse to the direction of deflection of the elements 44a and 44b, that is up and down the borehole 14, as shown by the solid circles 64 in FIG. 5. With the transverse arrangement of the pairs of elements 44a/44b and 44c/44d shown in FIG. 3, the polarizations of the respective S waves produced by these element pairs are also transverse to one another.

The slots 40 in the source section 30 provide a path for the propagation of acoustic energy from the transducer 42 to the borehole liquid 18 and the formation 16 surrounding the sonde 10. In addition they slow down the propagation of acoustic waves through the steel sleeve 48, thereby facilitating the use of this sleeve to protect the transducer 42 and provide mechanical strength. The magnitude of signals propagating through the sleeve 48 is further limited by minimizing the mechanical coupling between the transducer 42 and the sleeve 48. Thus, as illustrated in FIG. 6, the transducer 42 is supported by flexible rods 70 secured in holes 72 in the center of the support plates 46. These rods, which may be made for example of steel tubes loosely coupled by transverse pins, in turn secured at each end to a cross-plate 74 secured inside the sleeve 48.

Propagation of acoustic energy along the tool is also inhibited by the acoustic isolation joints 38. As shown in FIG. 2 these comprise lengths of steel wire 76 approximately 2 mm in diameter, bridging a gap between each section of the sonde 10. The gap is approximately 25 mm wide and the ends of the wires overlap the ends of the sonde sections by approximately 10 mm. The wires 76 are spaced approximately 30° apart around the outer periphery of the sonde sections and secured thereto in any convenient manner, such as by clamping them under the heads of bolts threaded into the sonde sections. It has been found that such a joint is simple and robust, resists bending and twisting of the sonde sections relative to one another and attenuates acoustic energy propagating along the sonde 10 by as much as 30 to 40 dB. To prevent ingress of material that might lodge in the gap between the sonde sections, the joint 38 is closed by a flexible sleeve 78, for example of rubber.

The lowest joint 38 connects the source section 30 to the spacer section 32 which comprises a blank steel pipe separating the acoustic source from acoustic receivers in the transmitter. This separation helps to isolate the detector section 34 from the propagation of acoustic energy along the body of the sonde 10.

Another isolation joint 38 couples the spacer section 32 to the detector section 34, which has a sleeve 80 of steel pipe perforated with slots 40 in the same manner as the source section 30. The detector section 34 contains an array of six acoustic detectors 82 for detecting acoustic radiation propagating through the borehole liquid 18 from the formation 16. Each of these detectors 82 is similar in structure and mounting to the source 42, and as shown in FIG. 7 has like-facing surfaces of opposed pairs of matched elements such as 84a and 84b connected in parallel to respective inputs of an amplifier 86. Thus each detector 82 has two associated amplifiers 86, the output of each of which is coupled to a respective analog-to-digital converter 88. This converter includes a sample-and-hold circuit and an oscillator which generates timing pulses to coordinate sampling and digitizing of the magnitude of the signal from the amplifier 86 are regular intervals, for example with a repetition rate of 100 kHz. The A-D converter 88 has a reset input R connected to the trigger signal line 50 to re-synchronize the oscillator in the converter 88 each time the source 42 is triggered.

The pairs of opposed elements such as 84a and 84b have a dipole sensitivity pattern as shown in FIG. 5, and the detectors 82 are oriented within the section 34 so that the polarization of shear waves sensed by each pair of elements is aligned with the polarization of the shear wave radiation produced by a corresponding pair of elements 44 in the source 42.

The third isolation joint 38 couples the detector section 34 to the coupling section 36 which comprises a blank steel pipe closed at one end and attached to the cable 12. This section may conveniently house circuitry for conditioning and communication of signals between the sonde 10 and the surface equipment 24, and for coordinating and controlling the operation of the sonde 10. In particular the digitized output signals of each A-D converter 88 are sent uphole via the circuitry in the section 36 and the cable 12 to the surface equipment 24 for recording and analysis as required.

Precise details of the circuit components such as amplifiers and analog-to-digital converters discussed herein are not a part of this invention, and being well known to those skilled in the art need not be described. Likewise the details of construction of the sonde 10, and its possible combination with other known logging devices such as a caliper and a gamma ray sonde, will be obvious to those skilled in this art. In particular, a device of known type for measuring the azimuthal orientation of the sonde 10 in the borehole 14 is desirably included.

In operation the pulser 52 is supplied with a train of trigger signals via the line 50. As explained above these trigger signals cause the opposed pairs of elements in the source 42 to be excited alternately, resulting in the propagation of shear wave energy through the formation of the detection of corresponding signals by the detectors 82. The interval between successive trigger signals is arranged to allow recording of waveforms from the detectors 84 of sufficient duration to include all components of interest before arrival of energy resulting from the next following energization of the source 42. This interval will therefore depend on the velocity of acoustic energy propagating through the formation 16, and may be fixed in advance in anticipation of expected shear velocity values for the formation 16 to be investigated or adjusted during logging in accordance with actual measured values. The repetition rate of the trigger signals will also depend on the rate at which the sonde 10 is drawn up the borehole 14 and the desired distance between formation points at which measurements are to be made. Thus for a measurement spacing of six inches at a logging speed of 1800 feet per hour, one trigger pulse per second suffices. A typical maximum trigger pulse rate is ten pulses per second. It is also preferable that the measurement spacing equal the spacing between detectors 82, by arranging that successive pairs of trigger pulses occur after the sonde 10 has moved a distance equal to the detector spacing, since this allows the use of analytical techniques which take advantage of the multiple redundant measurements obtained with an array of detectors. The A-D converter 88 is free-running, so it typically digitizes many samples between measurement trigger signals that are not required. These surplus measurements need not be recorded. However, the measurements occurring after a trigger signal but before acoustic energy reaches the detectors 82 preferably are recoded. This permits the initial part of the digitized signal, before arrival of acoustic energy of the detectors 82, to be used in establishing a zero level for analysis of subsequent parts of the digitized signal.

As each opposed pair of elements 44 is energized, corresponding signals are recorded both for the aligned elements 84 in the detectors 82 and for the orthogonal elements 84, so a total of four recordings are obtained from each of the six detectors 82 for each complete energization of the source 42. Since the sonde 10 is being gradually drawn up the borehole as the source 42 is repetitively triggered, successive sets of twenty-four recordings are provided by the array of detectors 82 for successive positions of the sonde 10. These recordings can be analyzed in a variety of ways to derive useful information about the formation 16.

Since the source 42 has a dipole radiation pattern as explained above, it can excite shear wave radiation in the formation 16 in a manner which permits detection by the detectors 82 irrespective of the relative acoustic velocities in the formation 16 and the liquid 18. Thus the determination of shear velocity for the formation 16 is possible even in soft or other types of slow formation, without resorting to indirect methods such as derivation from the velocity of other acoustic wave modes. In addition the detectors 82 are relatively insensitive to such modes as tube waves, which could otherwise constitute a source of perturbation of the wanted shear wave signals.

Figure 8:
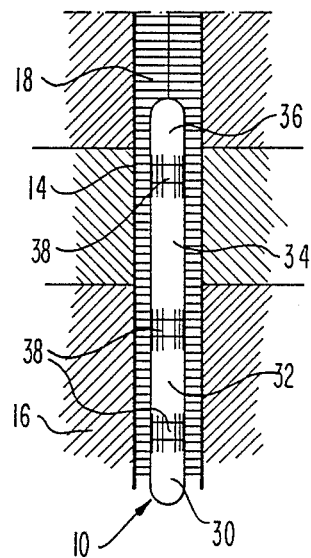
FIG. 8 is a diagram illustrating variation of shear velocity with polarization owing to stress and/or formation anisotropy.
Figure 8:
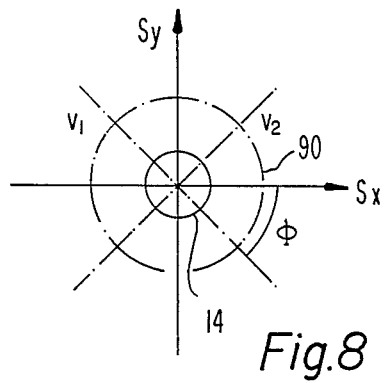

Other types of formation characteristic which can be investigated by measurements made with the sonde 10 include the presence and direction of formation or rock anisotropy (that is anisotropy in the physical character of the formation material), and the distribution of stress in the formation 16, in particular the direction and magnitude of any anisotropy in that stress. It is known that stress in a solid affects the velocity of shear wave acoustic energy propagating through that solid. A subsurface formation may sustain stresses that vary with direction (that is they are anisotropic), for example owing to tectonic forces. In such a case shear wave energy propagating with one polarization will have a velocity different from such energy propagating with a different polarization. Referring to FIG. 8, the borehole 14 is illustrated in cross-section and the axes $S_x$ and $S_y$ represent the directions of polarization of radiation generated by the element pairs 44a/44b and 44c/44d respectively in the source 42. Typically there will be two possible shear wave velocities, a minimum value $v_1$ for waves polarized in a direction at an angle $\Phi$ to the axis $S_x$, and a maximum value $v_2$ for waves polarized in the orthogonal direction. Excitation of shear waves in any other direction will generate two components polarized along these two directions. The variation with azimuthal direction in the relative amplitudes of these components is indicated in FIG. 8 by the circle 90. The distance from the $v_1$, $v_2$ axes of any point on the circle represents the amplitude of the respective shear wave components for excitation along a line passing that point and the origin. The quantities $v_1$, $v_2$ and $\Phi$ are of interest in, for example, the planning of fracturing operations for producing hydrocarbons from the borehole 14.

It can be shown that if the minimum and maximum shear velocities $v_1$ and $v_2$ are known the principal radial stresses $\sigma_1$ and $\sigma_2$ along the axes of $v_1$ and $v_2$ can be derived from the following relationships:

$$\rho v_1^2 = \mu + (\sigma_z/3K)(4\lambda + 4\mu + m + n\lambda/4\mu) + (\sigma_1/3K)\text{-}(\lambda + 2\mu + m + n\lambda/4\mu) + (\sigma_2/3K)(m - n(\lambda + \mu)/2\mu - 2\lambda) \quad (1)$$

$$\rho v_2^2 = \mu + (\sigma_z/3K)(4\lambda + 4\mu + m + n\lambda/4\mu) + (\sigma_1/3K)\text{-}(m - n(\lambda + \mu)/2\mu - 2\lambda) + (\sigma_2/3K)(\lambda + 2\mu + m + n\lambda/4\mu) \quad (2)$$

where $\rho$ is the formation density, $\mu$ and $\lambda$ are the second-order elastic (Lamé) constants of the formation, m and n are third-order elastic constants of the formation, K is the formation bulk modulus ($=\lambda 30\ 2\mu/3$) and $\sigma_z$ is the stress due to overburden pressure at that point in the formation. If it is assumed that the formation is isotropic, it can also be shown that the stress difference in the two directions of particle motion is given by:

$$\sigma_1 - \sigma_2 = 4\mu\rho(v_1^2 - v_2^2)/(4\mu + n) \quad (3)$$

All of the quantities $\rho$, $\mu$, $\lambda$, m, n and $\sigma_z$ can be measured, or their values derived or estimated from known formation parameters or core samples for example.

Further discussion of the expressions (1) to (3) can be found in 'On the feasibility of using sonic techniques to estimate in situ stresses' by Mao et al, Lawrence Livermore National Laboratory, June 1983, and in 'Second-order elastic deformation of solids' by Hughes et al, Phys. Rev., vol. 92, No. 5, Dec. 1953, pp. 1145-1149.

Even if only the shear velocities along the $S_x$ and $S_y$ axes are derived, rather than the maximum and minimum shear wave velocities $v_1$ and $v_2$, valuable information about the presence of anisotropy can be derived.

In one type of analysis of measurements made with the sonde 10, known techniques are used to drive the differing times of occurrence (or 'moveout') of shear wave components in the recorded waveforms obtained from correspondingly aligned element pairs 84a/84b of detectors 82 at different spacings from the source 42.

Figure 14:
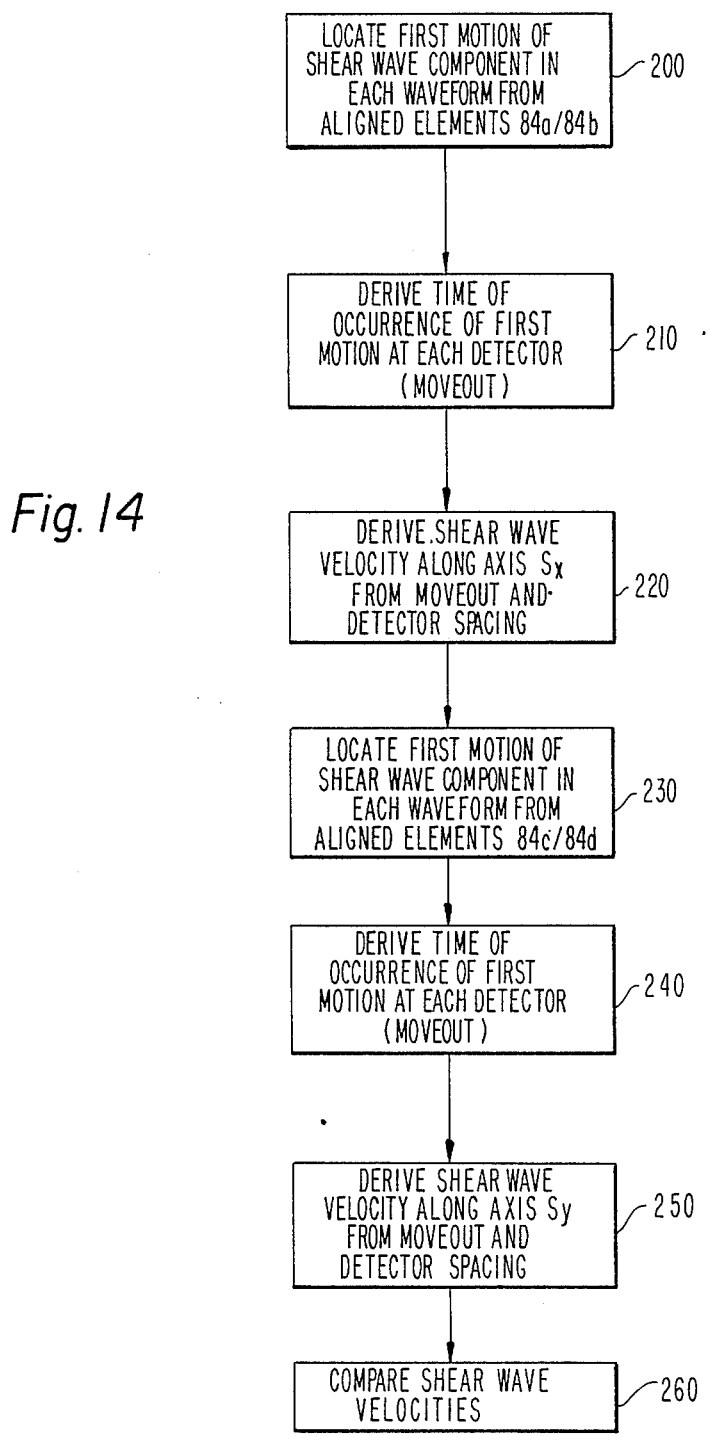
FIG. 14 is a flow chart for a first method of analyzing measurements made with the apparatus of FIG. 2.

Specifically, and is illustrated by step 200 in the flow chart shown in FIG. 14, the first motion of the shear wave component in each waveform is located, and then the time of occurrence of this first motion is determined (step 210) for each decoder. Knowing the spacing of the detectors 82, the movement enables the shear velocity to be found for acoustic energy polarized along the axis $S_x$, as at step 220. The shear velocity is likewise found for acoustic energy polarized in the transverse plane $S_y$, by reference to the recordings obtained from the other, transversely aligned elements 84c and 84d—steps 230 through 250. Comparison of these velocities, and in particular any difference between them, can then be used as at step 260 to derive valuable indications of the presence or absence of stress anisotropy, rock strength and fractures, for example. As indicated in FIG. 8 and mentioned above the velocity values obtained will not necessarily be the maximum and minimum values $v_1$ and $v_2$ for the formation 16 at the measurement depth, but will be related to those values by the (in this case unknown) azimuthal orientation $\Phi$ of the sonde 10 relative to the axes of anistropy.

Figure 15:
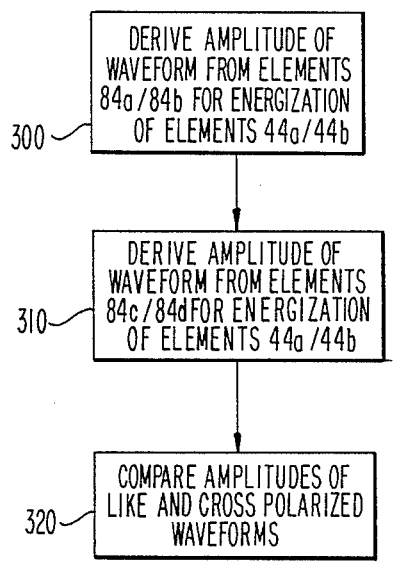
FIG. 15 is a flow chart for a second method of analyzing measurements made with the apparatus of FIG. 2.

Alternatively, and as shown in FIG. 15, the waveforms received by both orthogonal pairs of detector elements 84 upon energization of one of the pairs of source elements 44 can be analyzed to derive their amplitudes, as at steps 300 and 310, for example by measuring their peak amplitudes or integrating the waveforms with respect to time. Thus the energy, or a quantity functionally related thereto, of shear waves propagating with polarizations parallel and perpendicular to the source elements can be found. Comparison of these amplitudes or energies at step 320, for example by taking their ratio, is indicative of the presence of formation anisotropy.

A third possibility is to combine the signals from the orthogonal pairs of elements 84 in a detector 82 using sinusoidally weighted vector addition to simulate the effect of physically rotating the source 42 and the detectors 82. The shear wave X that would be received at time t by a single pair of detector elements aligned with a single pair of source elements and at an angle $\theta$ to the actual orientation of the elements 84a/84b is $$X(\theta,t) = X_x(t) \cos^2\theta + X_y(t) \sin\theta\cos\theta + Y_x(t) \cos\theta\sin\theta + Y_y(t) \sin^2\theta \quad (4)$$

where $X_x$ and $X_y$ represent the orthogonally polarized shear waves which are received at time t by the detector element pairs 84a/84b and 84c/84d respectively upon energization of the source element pair 44a/44b; and $Y_x$ and $Y_y$ represent the orthogonally polarized shear waves which are received at time t by those respective pairs upon energization of the source element pair 44c/44d.

Figure 16:
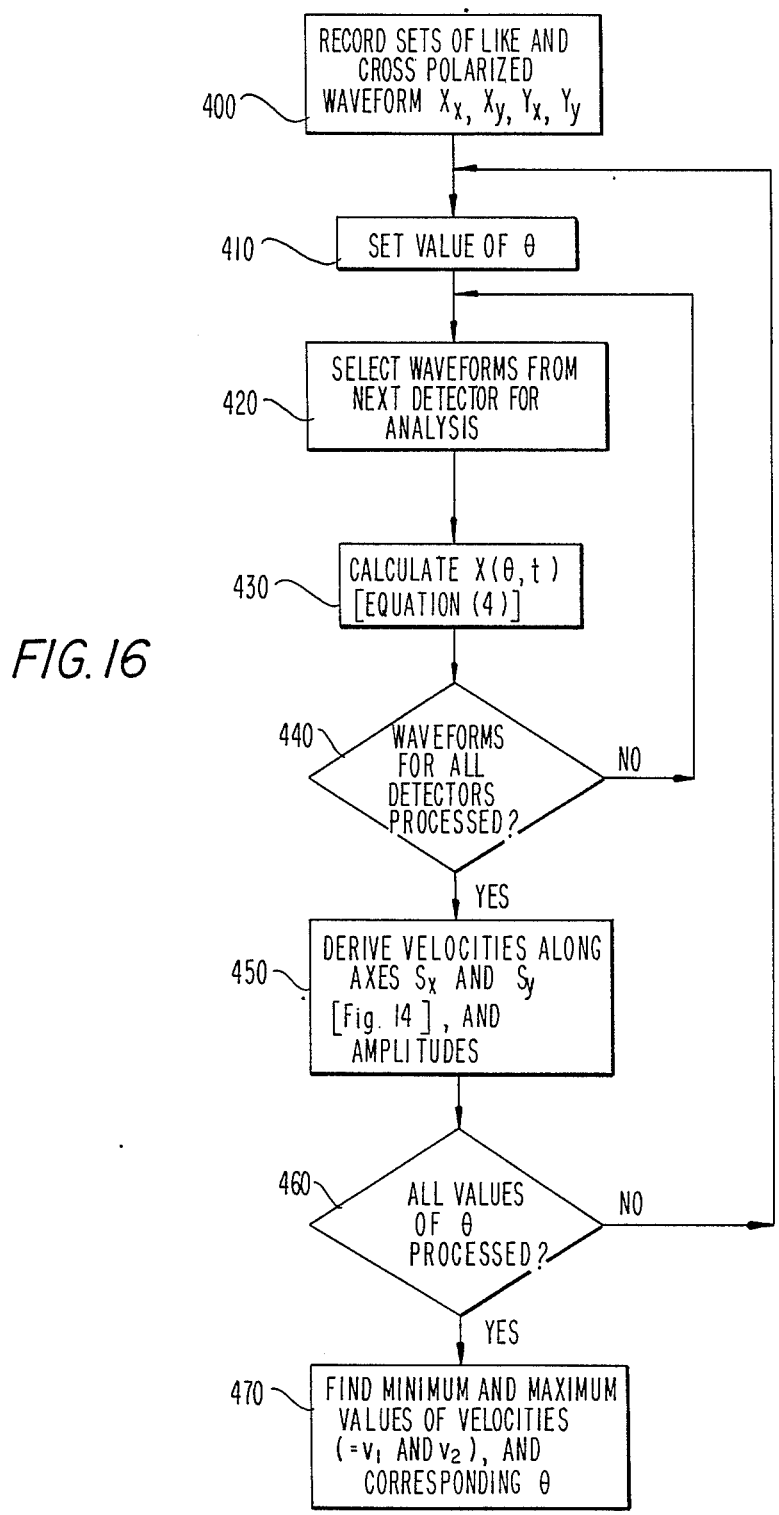
FIG. 16 is a flow chart for a third method of analyzing measurements made with the apparatus of FIG. 2.

Thus, referring to FIG. 16, the digitized sample values of the like and cross polarized waveforms supplied by the A-D converters are recorded at step 400. A value for the angle $\theta$ is set at step 410 and the waveforms for one of the detectors 82 are selected for analysis at step 420. The analysis proceeds to step 430 where the digitized sample values at the same time t in the waveforms from the selected detector 82, relative to the time of triggering of the source 42, are combined by vector addition, using the weightings given by equation (4), to produce a value representing a sample at time t of a new, synthesized, digitized waveform $X(\theta,t)$ for the angle $\theta$. Step 430 repeats this process for all values of t to produce a complete new waveform for the selected detector 82 at the current angle $\theta$. At step 440 a check is made as to whether the waveforms for all detectors 82 have been processed for the current value of $\theta$. If not the analysis returns to step 420 to select the waveforms from another detector 82 for vector addition at step 430. If the waveforms for all the detectors have been processed the analysis proceeds to step 450, where the set of synthetic waveforms thus generated is analyzed as described above with reference to steps 200 through 250 of FIG. 14 to derive values for shear velocity along the $S_x$ and $S_y$ axes, and also the signal amplitudes, for the current angle $\theta$. A step 460 a check is made to determine whether the processing for all desired values of $\theta$ has been accomplished. If not the procedure returns to step 410 to set another value of $\theta$ and repeat steps 420 through 450.

This process is thus performed for various values of $\theta$, after which the maximum and minimum values of the velocities derived at step 450 (interpolated relative to angle $\theta$ if desired) are determined at step 470, together with the corresponding value of $\theta$. These minimum and maximum values are the desired values $v_1$ and $v_2$, and the corresponding angle $\theta$ is the value of $\Phi$. These results taken in conjunction with orientation readings from an orientation device incorporated with the sonde 10 provide information on the direction and magnitude of any anisotropy in the formation 16, by means of the expressions (1) and (2) for example.

Another method of analyzing the angular dependency of the received signals involves expressing those signals for each detector 82 as a function of the signals $S_xf(t)$ and $S_yf(t)$ generated by the source element pairs 44a/44b and 44c/44d, as follows:

$$X_x(z,t) = (S_x/z)[\cos^2 \Phi f(t-z/v_1) + \sin^2 \Phi g(t-z/v_2)] \quad (5)$$

$$X_y(z,t) = (S_x/z) \sin \Phi \cos \Phi [-f(t-z/v_1) + g(t-z/v_2)] \quad (6)$$

$$Y_x(z,t) = (S_y/z) \sin \Phi \cos \Phi [-f(t-z/v_1) + g(t-z/v_2)] \quad (7)$$

$$Y_y(z,t) = (S_y/z)[\sin^2 \Phi f(t-z/v_1) + \cos^2 \Phi g(t-z/v_2)] \quad (8)$$

where z is the distance along the sonde 10 between the source 42 and the relevant detector 82 and f(t) and g(t) represent functions of time.

Figure 17:
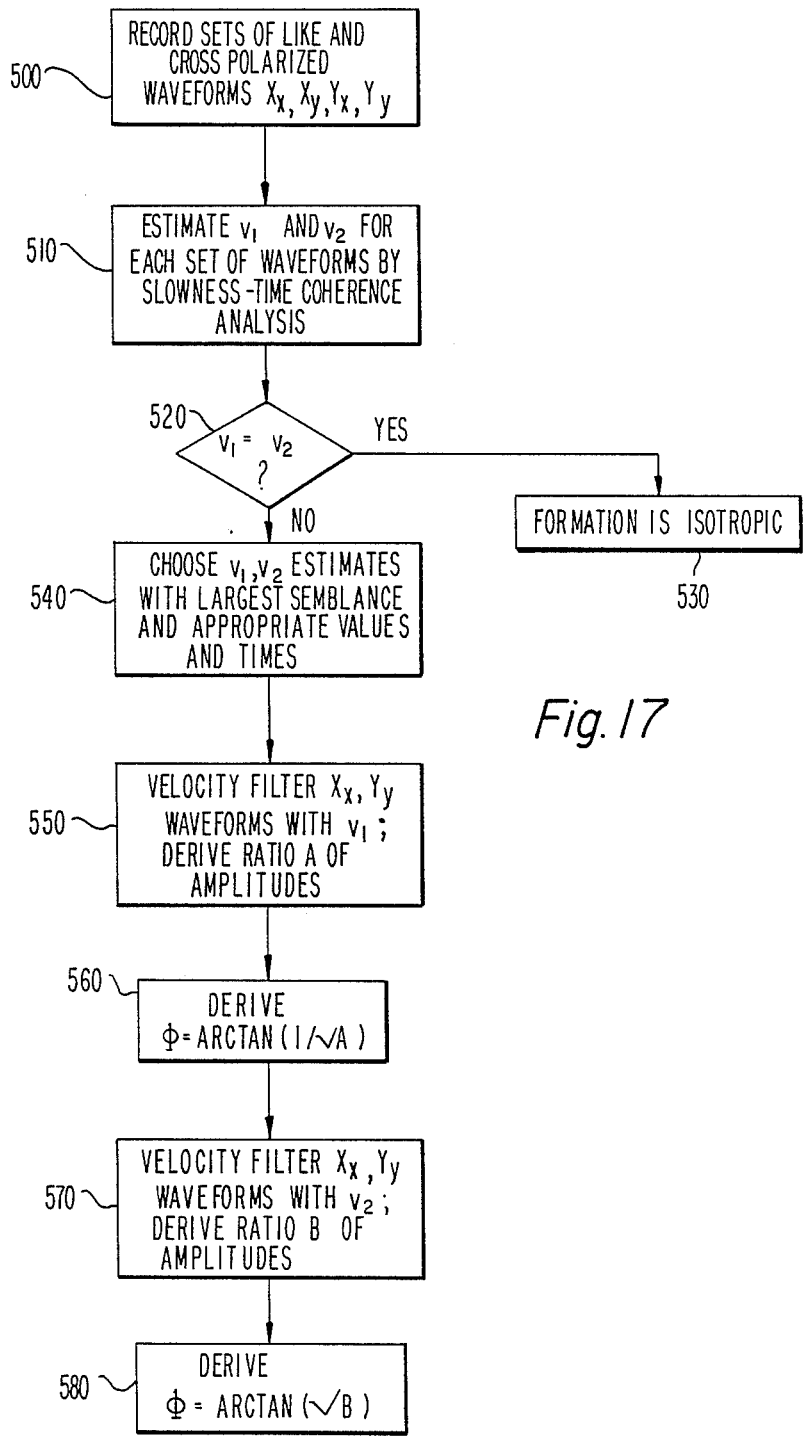
FIG. 17 is a flow chart for a fourth method of analyzing measurements made with the apparatus of FIG. 2.

Referring to FIG. 17, each of the sets of signals such as $X_x(z,t)$ is recorded at step 500 with the array of detectors 82. The waveforms for a given depth are then used to derive an estimate of the velocities $v_1$ and $v_2$ at that depth, at step 510. This may be accomplished using any of several known techniques for analyzing signals from arrays of detectors, such as slowness-time coherence analysis (U.S. Pat. No. 4 594 691), shot to shot processing (U.S. Pat. No. 4 543 648), the maximum likelihood method or Prony's method for example. At step 520 the estimated velocity values are compared. If they are substantially equal, that is only a single shear wave velocity is derived, it can be concluded that the formation is isotropic, as at step 530. However, if there are two distinct velocities, a choice is made at step 540 among the estimates derived from each of the signals such as $X_x(z,t)$. This choice may be made, for example in the case of slowness-time coherence analysis, by selecting the estimates which have the largest semblance values together with appropriate values for velocity and time relative to the known properties of the formation 16. In the case of an analysis which yields amplitude values, such as Prony's method, the estimates having the largest associated amplitudes may be chosen.

The chosen estimate of the velocity $v_1$ is then used at step 550 to control velocity filtering of the waveforms from the array of detectors 82. This is done for example by stacking the waveforms with a time offset between waveforms from adjacent detectors that is a function of the estimated velocity $v_1$ and detector spacing. This emphasizes the component of the waveforms corresponding to the velocity $v_1$. The amplitude of the $v_1$ component in the filtered $X_x$ waveforms is proportional to the term $\cos^2 \Phi f(t=z/v_1)$ of equation (5), and the amplitude of this component in the filtered $Y_y$ waveforms is proportional to the term $\sin^2 \Phi f(t-z/v_1)$ in equation (8). Thus the ratio A of the filtered $v_1$ amplitude of the $X_x$ waveforms to the filtered $v_1$ amplitude of the $Y_y$ waveforms is equal to $1/\tan^2 \Phi$, from which $\Phi$ can be directly obtained at step 560. The chosen estimate of the velocity $v_2$ is likewise used to control velocity filtering of the same waveforms at step 570, and the ratio B of the filtered $v_2$ amplitudes of these waveforms is derived. This ratio B is equal to $\tan^2 \Phi$, enabling a second derivation of $\Phi$ at step 580 as a cross-check for the first value obtained.

If the spacing z between the source 42 and the detectors 82 is made large enough for the different shear wave velocities $v_1$ and $v_2$ to produce distinct components of the waveforms generated by the detectors 82, a modification of the technique just described can be used. In this case during the time period $z/v_2 < t < z/v_1$ the equations (5) through (8) above become:

$$X_x(z,t) = (S_x/z) \sin^2 \Phi g(t-z/v_2) \quad (5')$$

$$X_y(z,t) = (S_x/z) \sin \Phi \cos \Phi g(t-z/v_2) \quad (6')$$

$$Y_x(z,t) = (S_y/z) \sin \Phi \cos \Phi g(t-z/v_2) \quad (7')$$

$$Y_y(z,t) = (S_y/z) \cos^2 \Phi g(t-z/v_2) \quad (8')$$

Figure 18:
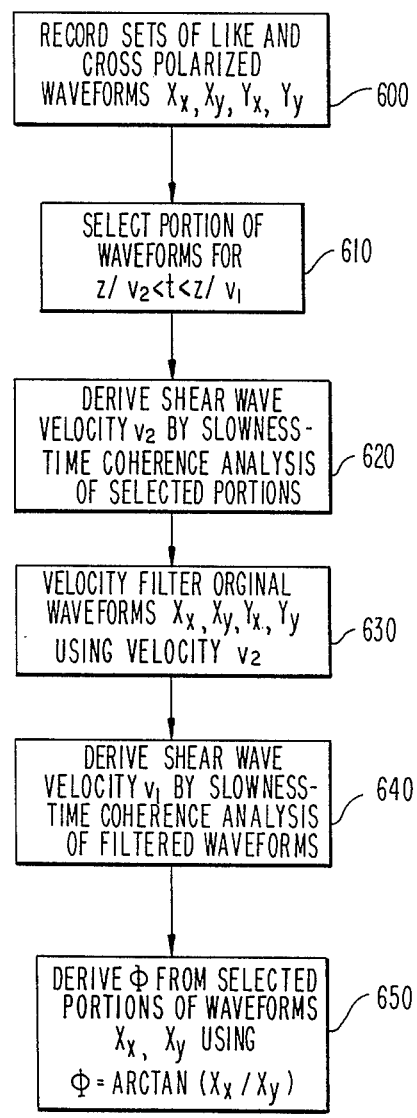
FIG. 18 is a flow chart for a fifth method of analyzing measurements made with the apparatus of FIG. 2.

Accordingly, as shown in FIG. 18, the like and cross polarized waveforms are recorded at step 600 and the portions of these waveforms for the time period $z/v_2 < t < z/v_1$ are selected at step 610. Detection of the shear wave first arrivals in these signals, by first motion (threshold) detection, or by slowness-time coherence analysis with a short time window extending no later than $z/v_1$, enables the presence and velocity $v_2$ of the faster shear wave component to be derived, as at step 620. The original waveforms such as $X_x(z,t)$ of equations (5) through (8) are then velocity filtered using this value of $v_2$ at step 630 to remove this faster shear wave component, and the filtered waveforms used at step 640 to estimate the velocity $v_1$ of the slower component. The angle $\Phi$ is derived at step 650 from a combination of portions of waveforms such as $X_x(z,t)$ and $X_y(z,t)$ selected at step 610. This derivation may use any of several relationships between the waveform amplitudes and $\Phi$, such as $\tan \Phi = X_x/X_y = Y_x/Y_y$, or $\tan^2 \Phi = X_x/Y_y$.

Equation (4) above for synthesizing the effect of rotating the source 42 and the detectors 82 relates to the specific situation in which the source and detectors are rotated in synchronism to remain in alignment. The signal that would be obtained in the more general case where the source 42 and the detectors 82 are at arbitrary angles $\theta_s$ and $\theta_d$ with respect to the elements 84a/84b can be synthesized from the detector signals according to the relation:

$$X(\theta_s,\theta_d,t)=[X_x(t)\cos\theta_d+X_y(t)\sin\theta_d]\cos\theta_s+[Y_x(t)\cos\theta_d+Y_y(t)\sin\theta_d]\sin\theta_s \quad (9)$$

It will be apparent to those skilled in the art that the above described analyses can be performed, for example, by means of an appropriately programmed digital computer or alternatively by using special-purpose circuitry.

Furthermore, instead of incorporating angular functions during analysis of the recorded signals subsequent to logging, these functions can be applied during the logging operation itself. Thus, in one modification of the sonde 10 shown in FIG. 9, the signal from the pulser 52 is supplied to a pair of variable-gain push-pull amplifiers 100 and 102. These supply drive signals to the elements pairs 44a/44b and 44c/44d respectively with amplitudes $A_1$ and $A_2$ controlled by signals on control lines 104 and 106. The effective azimuthal direction $\theta$ of the polarization of the shear waves propagated by the source 42 can be steered by appropriate variation of the amplitudes $A_1$ and $A_2$, according to the relation $$\theta=\tan^{-1}A_2/A_1 \quad (10)$$

A particularly advantageous version of this implementation is to vary the angle $\theta$ at a frequency equivalent to the frequency of the waveform supplied by the pulser 50 to the amplifiers 100 and 102. This has the effect of propagating acoustic energy in the formation 16 with circular polarization.

Figure 10:
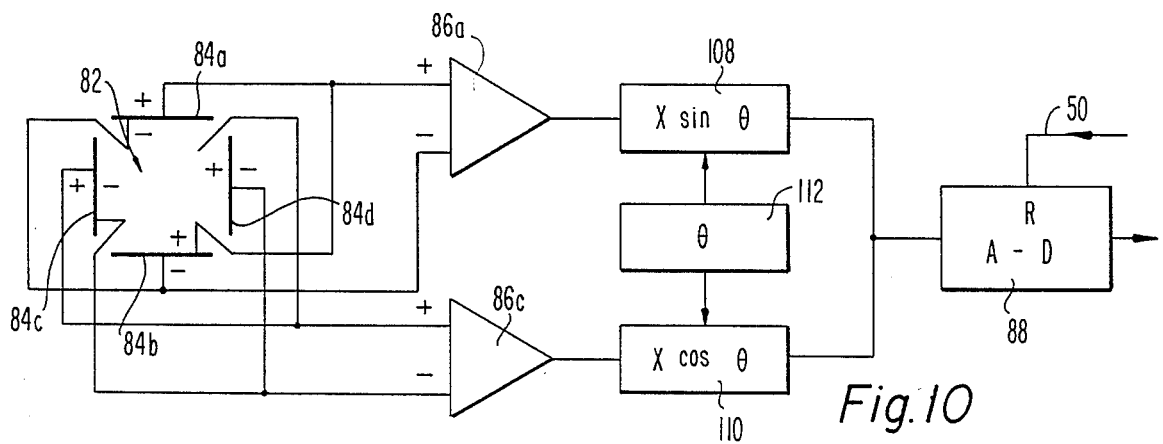
FIG. 10 is a block diagram of a modified form of circuitry associated with a detector transducer forming part of the apparatus of FIG. 2.

The direction of signals sensed by the detectors 82 can likewise be steered as shown in FIG. 10. Each pair of detector elements 84a/84b and 84c/84d is coupled to a respective amplifier 86a and 86c which in turn feeds a respective multiplier 108 and 110. These multipliers multiply the amplified signals by respective functions $\cos\theta$ and $\sin\theta$ received from an oscillator 112. The outputs of the multipliers 108 and 110 are summed and digitized by the A-D converter 88, giving the vector sum $$X(\theta,t)=X_x(t)\cos\theta+X_y(t)\sin\theta \quad (11)$$

which would be produced by a single pair of opposed elements such as 84a/84b oriented at an angle $\theta$ to the pair of elements 44a/44b of the source 42.

Another way of steering the dipole radiation pattern of either the source 42 or the detector 82 is to rotate the transducer physically by means of, for example, a stepping motor having a shaft on which the transducer is mounted. However, the electronic steering described above has the advantages of avoiding the need for movable transducers, permitting various steering options to be investigated during subsequent processing and permitting movement of the dipole radiation patterns at speeds that would be difficult or impossible to accomplish with motor-driven transducers.

Figure 9:
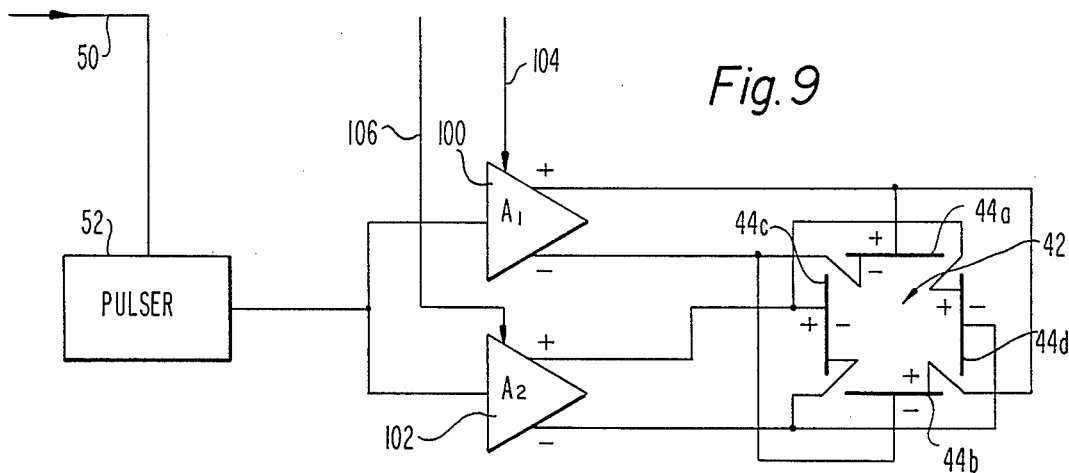
FIG. 9 is a block diagram of a modified form of circuitry associated with a source transducer forming part of the apparatus of FIG. 2.
Figure 11:
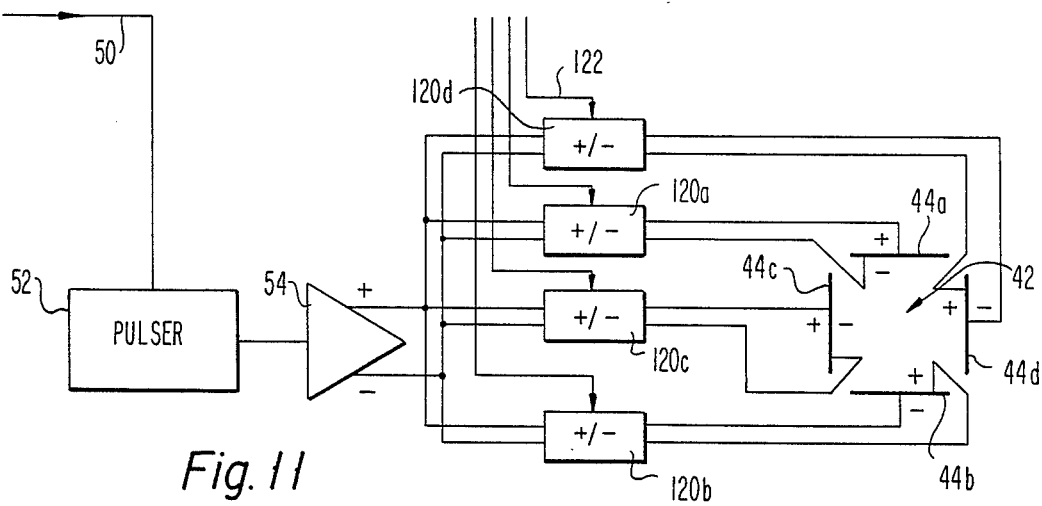
FIG. 11 is a block diagram of another modified form of circuitry associated with a source transducer forming part of the apparatus of FIG. 2.

Instead of directly coupling opposed source elements 44 as shown in FIGS. 4 and 9, it is also possible to provide each such element with individual drive signals as shown in FIG. 11. Referring to FIG. 11, the signal from the push-pull amplifier 54 is supplied to four controllable inverters 120a to 120d which in turn drive respective elements 44a to 44d of the source 42. The polarities of the drive signals from the controllable inverters 120 are controlled by signals on lines such as 122. Appropriate choice of these polarities relative to one another enables the radiation pattern of the source 42 to be selected from a wide variety, such as the dipole pattern of FIG. 5, a monopole pattern, or a quadrupole pattern for example. Likewise the individual detector elements 84 can be connected to respective amplifiers and A-D converters, and their signals combined with appropriate phases and weightings to simulate monopole, dipole or quadrupole detectors.

Various other modifications to the sonde design described above are possible. Thus the two opposed pairs of elements such as 44a/44b and 44c/44d may be replaced by a two elements mounted transversely to one another and offset a small distance axially along the sonde 10. Other shapes for the elements 44, such as circular, are possible. Other types of element besides bimorph benders are usable, such as piezoelectric transducers shaped as quadrants of a cylinder, or electrodynamic transducers. Instead of providing an individual A-D converter for each detector element or connected group of elements, fewer converters may be used together with circuitry for multiplexing each converter among several detector elements.

The spacer section 32 and/or one of the lower two isolating joints 38 may be omitted. The design of the isolating joints may differ from that shown in FIGS. 1 and 2. Thus, as shown in FIG. 12, the joint may comprise a short steel cylinder 130 of smaller diameter than a sleeve such as the source section sleeve 48. This cylinder is disposed within and between the sleeve 48 and the spacer section 32, and is retained by two pins 132 extending through holes 134 in the cylinder 130 and corresponding holes 136 in the sleeve 48 and the spacer section 32. Sound absorbers such as rubber O-rings 138 are disposed between the cylinder 130 and the sleeve 48 or the spacer section 32. Another design for the joint 38 is shown in FIG. 13, in which the facing ends of adjacent sections such as 30 and 32 are made solid, with spherical recesses 140 containing the spherical ends 142 of a dumb-bell shaped ball-joint link 144 extending between the sections 30 and 32.

There has been described and illustrated herein methods and apparatus in accordance with the present invention for multipole acoustic logging. While particular embodiments of the invention have been described, it is not intended that the invention be limited thereby. Therefore it will be apparent to those skilled in the art that various changes and modifications may be made to the invention as described without departing from the spirit and scope of the appended claims.

We claim:

1. In a logging tool for use in a borehole traversing an earth formation, the tool having a multiple dipole source connected to the tool in a fixed position and orientation to generate shear wave radiation in multiple directions in the formation upon excitation, and a plurality of multiple dipole detectors to receive shear waves in multiple directions radiated through the formation, wherein the detectors are connected to the tool in a fixed position and orientation and spaced apart from each other a predetermined distance along the longitudinal axis of the tool, a method of determining the magnitude and direction of an anisotropy in the formation, said method comprising the steps of:

generating shear wave radiation in a first direction;

receiving at each detector at least a portion of the generated shear wave in a second and a third direction;

generating shear wave radiation in a fourth direction;

receiving at each detector at least a portion of the generated shear wave in a fifth and a sixth direction;

determining, for each detector, a composite dipole waveform for a plurality of azimuthal directions based on at least a portion of the received waveforms in the second, third, fifth and sixth directions received at each detector;

determining, for each azimuthal direction, a shear wave velocity based on the composite dipole waveforms determined for each azimuthal direction; and obtaining the magnitude and direction of formation anisotropy, relative to the position of the logging tool, based on the minimum and/or maximum values of shear wave velocity determined for the plurality of azimuthal directions.

2. The method of claim 1, wherein the second direction is substantially perpendicular to the third direction.

3. The method of claim 1, wherein the fifth direction is substantially perpendicular to the sixth direction.

4. The method of claim 1, wherein the first direction is substantially perpendicular to the fourth direction.

5. The method of claim 1, wherein the first direction is substantially parallel to the second direction.

6. The method of claim 1, wherein the fourth direction is substantially parallel to the fifth direction.

7. The method of claim 1, wherein the second direction equals the fifth direction.

8. The method of claim 1, wherein the third direction equals the sixth direction.

9. In a logging tool for use in a borehole traversing an earth formation, the tool having a multiple dipole source connected to the tool in a fixed position and orientation to generate shear wave radiation in multiple directions in the formation upon excitation, and a plurality of multiple dipole detectors to receive shear waves in multiple directions radiated through the formation, wherein the detectors are connected to the tool in a fixed position and orientation and spaced apart from each other a predetermined distance along the longitudinal axis of the tool, a method of determining the magnitude and direction of an anisotropy in the formation, said method comprising the steps of:

generating shear wave radiation in a first direction;

receiving at each detector at least a portion of the generated shear wave in a second and a third direction;

generating shear wave radiation in a fourth direction;

receiving at each detector at least a portion of the generated shear wave in a fifth and a sixth direction;

estimating the minimum and maximum shear wave velocities based on at least a portion of the received waveforms in the second, third, fifth and sixth directions received at each detector;

velocity filtering the received waveforms in the second, third, fifth and sixth directions received at each detector; and estimating the direction of anisotropy of the formation based on the amplitude of the velocity filtered waveforms.

10. The method of claim 9, wherein the second direction is substantially perpendicular to the third direction.

11. The method of claim 9, wherein the fifth direction is substantially perpendicular to the sixth direction.

12. The method of claim 9, wherein the first direction is substantially perpendicular to the fourth direction.

13. The method of claim 9, wherein the first direction is substantially parallel to the second direction.

14. The method of claim 9, wherein the fourth direction is substantially parallel to the fifth direction.

15. The method of claim 9, wherein the second direction equals the fifth direction.

16. The method of claim 9, wherein the third direction equals the sixth direction.

17. In a logging tool for use in a borehole traversing an earth formation, the tool having a multiple dipole source connected to the tool in a fixed position and orientation to generate, upon excitation, shear wave radiation in any azimuthally-variable polarization direction in the formation, relative to the orientation of the tool, said multiple dipole source comprising:

a first and a second variable-gain push-pull amplifier, each of said amplifiers having a control input and a positive and a negative output, said amplifiers having variable gain amplitudes A1 and A2, respectively, based on their respective control input;

a first dipole source having first and second diametrically-opposed elements, said first and second elements each electrically connected to said positive and negative outputs of said first amplifier;

a second dipole source having first and second diametrically-opposed elements, said first and second elements each electrically connected to said positive and negative outputs of said second amplifier;

pulser means for generating a waveform, said pulser means electrically connected to the inputs of said amplifiers which supply said dipole sources, wherein the azimuthal direction of the radiated shear wave polarization output from said dipole source is determined based on the ratio of gain amplitudes A1 and A2.

18. The apparatus of claim 17, wherein said first dipole source is substantially perpendicular to said second dipole source.

19. In a logging tool for use in a borehole traversing an earth formation, the tool having a multiple dipole detector connected to the tool in a fixed position and orientation to receive shear wave radiation in any predetermined azimuthally-variable polarization direction in the formation, relative to the orientation of the tool, said multiple dipole receiver comprising:

a first and a second amplifier, each of said amplifiers having a positive and a negative input and an amplified output thereof;

a first dipole detector having first and second diametrically-opposed detector elements, said first and second elements each electrically connected to said positive and negative inputs of said first amplifier;

a second dipole detector having first and second diametrically-opposed detector elements, said first and second elements each electrically connected to said positive and negative inputs of said second amplifier;

a first multiplier having an input electrically connected to said first amplifier and an input to receive a waveform signal, said first multiplier to multiply said first amplifier output by a first trigonometric function of the waveform signal, outputting the multiplied signal as a first trigonometric signal;

a second multiplier having an input electrically connected to said second amplifier and an input to receive the waveform signal, said second multiplier to multiply said second amplifier output by a second trigonometric function of the waveform signal, outputting the multiplied signal as a second trigonometric signal;

an oscillator to generate the waveform signal, said oscillator electrically connected to said first and said second multipliers; and an adder electrically connected to the outputs of said first and second multipliers to sum the first and second trigonometric signals, wherein the predetermined azimuthal polarization direction of the shear wave radiation to be received is determined based on the angle employed in the first and second trigonometric functions.

20. The apparatus of claim 19, wherein said first dipole detector is substantially perpendicular to said second dipole detector.

21. The apparatus of claim 19, wherein said first trigonometric function is a sine function.

22. The apparatus of claim 19, wherein said second trigonometric function is a cosine function.

* * * * *